(12) United States Patent
Shu

(10) Patent No.: US 9,022,348 B2
(45) Date of Patent: May 5, 2015

(54) TRIPLE OFFSET BUTTERFLY VALVE AND ROTARY FOR SEVERE SERVICES

(76) Inventor: Jianchao Shu, Cypress, TX (US)

(*) Notice: Subject to any disclaimer, the term of this patent is extended or adjusted under 35 U.S.C. 154(b) by 55 days.

(21) Appl. No.: 13/600,196

(22) Filed: Aug. 30, 2012

(65) Prior Publication Data

US 2013/0056667 A1    Mar. 7, 2013

Related U.S. Application Data

(60) Provisional application No. 61/575,996, filed on Sep. 1, 2011.

(51) Int. Cl.
| F16K 47/00 | (2006.01) |
| F16K 1/226 | (2006.01) |
| F16K 47/08 | (2006.01) |
| F16K 1/22 | (2006.01) |
| F16K 27/02 | (2006.01) |

(52) U.S. Cl.
CPC .............. *F16K 1/2268* (2013.01); *F16K 47/08* (2013.01); *F16K 1/224* (2013.01); *F16K 1/2261* (2013.01); *F16K 27/0218* (2013.01)

(58) Field of Classification Search
USPC ............ 251/314, 316, 317, 317.01, 305, 306, 251/307
See application file for complete search history.

(56) References Cited

U.S. PATENT DOCUMENTS

| 2,788,016 | A | * | 4/1957 | Scherer .................... 137/246.19 |
| 3,442,488 | A | | 5/1969 | Adams |
| 3,905,577 | A | | 9/1975 | Karpenko |
| 4,007,908 | A | | 2/1977 | Smagghe |
| 4,037,819 | A | | 7/1977 | Kindersley |
| 4,394,023 | A | | 7/1983 | Hinojosa |
| 4,479,509 | A | * | 10/1984 | Dear et al. ..................... 137/560 |
| 4,483,513 | A | | 11/1984 | Summers |
| 4,667,929 | A | | 5/1987 | Narduzzi |
| 4,828,221 | A | | 5/1989 | Scobie |
| 4,886,241 | A | | 12/1989 | Davis et al. |
| 5,377,954 | A | | 1/1995 | Adam et al. |
| 5,692,725 | A | | 12/1997 | Fehringer |
| 5,871,203 | A | | 2/1999 | Gasaway |
| 6,029,949 | A | | 2/2000 | Brown et al. |
| 6,079,695 | A | | 6/2000 | Gasaway |
| 6,338,468 | B1 | | 1/2002 | Ogawa et al. |
| 6,488,263 | B2 | * | 12/2002 | Robert ......................... 251/214 |
| 6,945,273 | B2 | * | 9/2005 | Reid ........................ 137/614.06 |
| 7,004,452 | B2 | | 2/2006 | Chatufale |
| 2008/0203346 | A1 | | 8/2008 | Shu |
| 2011/0084456 | A1 | | 4/2011 | Ohmi et al. |

* cited by examiner

*Primary Examiner* — John K Fristoe, Jr.
*Assistant Examiner* — Kevin Barss (57) ABSTRACT

This invention relates to a novel rotary control valve with new joint methods and flow control mechanisms, inline-reparability and fully metal seals more particularly to a triple offset butterfly valve or ball valve with those features used for on-off and flow controlling under multiple extreme conditions or in severe services; such as the integrated gasification combined cycle under high temperature and pressure, Fluid Catalytic Cracking under high temperature over 1200 F with hard diamond like catalytic particles, shale fracking process under extreme high pressure and high velocity fluid with solid particles and corrosive additives and other critical applications for products life lasting 5 to 30 years like deepsea flow control systems and nuclear power plants and for the applications of millions cycles like jet or rocket turbine engine fuel delivery systems with high velocity fuel fluid mixed with highly oxidative gas under temperature 1365 F.

10 Claims, 8 Drawing Sheets

TRIPLE OFFSET BUTTERFLY VALVE AND ROTARY FOR SEVERE SERVICES

CROSS-REFERENCE TO RELATED APPLICATIONS

This application claims the benefit of provisional patent application Ser. No. 61/575,996 filed on Sep. 1, 2011 by Jianchao Shu

FEDERALLY SPONSORED RESEARCH

No

SEQUENCE LISTING OR PROGRAM

No

BACKGROUND

This invention relates to a novel rotary control valve with new joint methods and flow control mechanisms, inline-repairability and fully metal seals more particularly to a triple offset butterfly valve or ball valve with those novel features used for on-off and flow fluid controlling under multiple extreme conditions or in severe services; such as the rocket engine fuel control system with highly oxidative fluid under extreme temperature of 1350 F, the integrated gasification combined cycle (IGCC) under high temperature and pressure, Fluid Catalytic Cracking Unit (FCCU) under high temperature over 1200 F with hard diamond like catalytic particles, shale fracking process under extreme high pressure and high velocity fluid with solid particles and corrosive additives, other applications with flow fluid with high viscosity in field of chemical plants, or conventional power plants, refiners and oilfield, or other critical applications for products life lasting 5 to 30 years like deepsea flow control systems and nuclear power plants and for the applications of millions cycles like jet or rocket turbine engine fuel delivery systems with high velocity fuel fluid mixed with highly oxidative gas under temperature 1365 F or higher without failure.

This valve comprises a body with a flow port and a stem bore, a stem keyed with a disc is disposed in the stem bore to rotate the disc between open and closed positions, noise/cavitation reducing trims are installed in both ends of the flow port to reduce cavitation or noise, this valve is fully sealed in the stem by a simple, reliable metal K ring with laminated metal packings and in the port by full metal wave seat rings instead of conventional laminated seat with metal rings, graphite rings and gasket. It has a simple base structure with versatile configurations for various applications and is easy for manufacturing and repair, yet robust and reliable.

Conventional triple offset butterfly valves were developed in 1960s, but since then most features have not been changed, historically there is misunderstanding that the triple offset mechanism can solve all rotary metal seal problems, technically it only solve the rubbing problem to a some level, the rubbing happens between the conical seat and conical seat ring during rotation between 0-90 degrees, it damages the seat and seal ring and cause high torque, leak and seat prematurely to wear out and like the most ball valves, 98% of all existing triple offset butterfly valves only solve this rubbing problem between 0-86 degrees at best, it means that the rubbing still happens between 87 to 90 degrees, only 3 degrees but with 60%-100% contact area, it still causes damage on the seat, so how to reach 0-89.95 or 0-89.99 degrees of disengagement becomes an art and a knowhow or trade secret, there are other seven existing problems which have nothing to do with triple offset mechanism (1) metal to metal seat seal, there is no good solution so far, either the original solid seat has high leakage under ANSI class III leakage or the laminated seat with metal rings glued with graphite rings has ANSI class VI leakage at a new condition, but (a) the seat is easily damaged either by flow or a mating seat ring, it is required that high preload is to secure a seal between the seat and disc or body with additional graphite gasket and constantly replacement for the seat (b) the seat can not be used on highly oxidative flow applications when temperature is over 850 F (c) high seating torque, on average, operating torque for triple offset butterfly valves with the laminated seat is at least as twice high as that of the same size of double offset butterfly valve due to high prebolting on the seat as well as the nature of seat structure, moreover the actuation forces are unpredictable at a closed position, so it is difficult to automate (2) axial bolting joint between retaining ring and seat ring on the disc, most conventional seal ring joint devices employ direct screws or sleeve to secure seal rings, such a method not only produces uneven pressing forces on seal rings and seats, but also has a lower reliability with multiple bolting and high probability of screws falling into pipelines under vibration or high cycle conditions, according to Failure Modes and Effects Analysis (FMEA), such a structure has the highest severity in high vibration, high temperature applications like turbine or jet engine systems, a risk of bolts falling in a pipeline system is very high due to vibration, quick cycle and high temperature creep (3) the graphite stem seals, the stem seal with graphite needs excessive packing force and constant readjustment or replacement of packing, moreover the actuation forces are unpredictable, so it is difficult to automate, in case of subsea flow devices or nuclear power plants, or jet engine fuel delivery system, the constant readjustment is impracticable (4) key/pin joint between stem and disc, this conventional joints greatly reduce the strength of stem with high stress concentration on disc hub and stem as well as eliminate the freedom for the stem and disc expansion under high temperature and pressure by a pin joint or have freedom of movement but cause loss motion and backlash with a key joint, as a result, either the joint method can cause premature damage on seats and seat leak (5) lack of simple mechanism to reduce the cavitation and noise when the valve is used to throttle the flow (6) unidirectional seal and stem galling under high thermal cycle or high temperature, although many triple offset valve makers claim that their valves are bidirectional, in fact the upstream seal is tended to move the seat away from the body seal ring, moreover there are cumulative clearances between bearing inside diameter and stem, stem and disc hub, body bearing hole and bearing outside diameter, sometime after sudden closing, the valves start to leak due to the clearances, so the current solution is to tight the clearances, as a result, stem will tend to gall with bearing under high temperature or thermal cycle, in short those problems greatly reduce potential usage of the triple offset butterfly valve and prevent it from getting more market share (7) Inline reparability, in some applications, the valves are fully welded with the pipe line, so it is impossible for inline repair, so replacement for the whole valve or offline repair can cost lots money for customers.

In order to overcome the disadvantages or solve the problems of the conventional triple offset butterfly valve, many efforts have been made in the prior arts. The efforts in five fields were made to improve the conventional valves in the prior arts, but those works within a limited scope.

The first field is for improving the seat seal, many efforts were made, especially in metal to metal seat seal in high temperature, cryogenic environments or for highly abrasive or erosive fluid applications. The significant efforts were made by Karl Adam as shown in U.S. Pat. No. 3,442,488 (1969), a butterfly valve with a triple offset arrangement for reducing rubbing between a seat and a seal ring or disc and increasing the life of the seat seal, but the seat seal itself was not improved and has a solid surface vs. a solid surface seal, such a seal causes high operation torque, leakage and requires expensive precision machining and assembly. U.S. Pat. No. 4,667,929 to Franco Narduzzi (1986) discloses a similar offset arrangement on a ball valve, a seat seal is provided with a solid surface on a body against a solid surface on a ball, a seal ring on the ball is made out of a composite metal material with heat resistant and deformable natures, in the reality such an ideal material is difficult to make, moreover a secure means was not clearly disclosed, the secure means is the other key factor for a good metal seal under high temperature, without a good seat secure means, a stable metal seat seal is impossible. U.S. Pat. No. 3,905,577 to Anatole N. Karpenko (1975) discloses a replaceable laminated seat against solid surface of disc, this seat would be a good choice for a metal to metal seat seal, but the bolts and rivets are used as a secure means completely constrain the seat thermal expansion under high temperature, as the temperature increases, the seat will deform and loosen a seal. U.S. Pat. No. 5,377,954 to Siegbert Adam et al (1995) discloses a metal seat seal which has a solid surface vane against a flexible seal ring assembly, the flexible seal ring assembly has multiple rings with one support end and an unmatched seal surface against the vane, such a seat seal is stronger and more stable than seat seal in U.S. Pat. No. 4,037,819, but the seat seal still is unstable under high pressure or high cycle condition and also creates a new problem which is fluid seeping between the rings, although edge welded by a laser welder is provided as a remedy, such a weld process brings out another problem which is deformation of seal ring after welding, such deformation can generate more leakage on external surfaces of the ring, above all, the seat seal is unstable and vulnerable to fluid contamination and any point damage on the seal. U.S. Pat. No. 5,871,203 to Jerry Gassaway (1999) shows a widely used, laminated seat ring as a replaceable seat ring, but the replaceable seat ring without a secure means has a disadvantage in high temperature or high cycle environments, the different thermal expansion between a body and the seal ring can cause leakage through the seat ring. In short all efforts in the prior arts never address or recognize the fundamental problems—laminated seat seal mechanism, rigid flat ring deformation structure with weak graphite rings between them.

The second field is for improving the joint between the seat and the retaining ring. A conventional mechanical joint means for retaining a seat seal assembly on a valve member or body is accomplished by a retaining ring and multiple bolts as shown in U.S. Pat. No. 6,079,695 to Jerry Gassaway (2000), such a mechanical joint means requires precision drilling and tapping as well as tedious bolting process, any uneven bolting by manual operation or other process can cause a seat leak and heavy seating and unseating torques specially in large size valves or in high temperature environments, more importantly this mechanical joint means has a high risk of bolts falling into a pipeline system and is prohibited for using in the engines and turbines or other highly vibrated conditions, so a more reliable retaining device was developed as shown in U.S. Pat. No. 5,692,725 to Hans-Jurgen Fehringer (1997), the retaining device has smaller operating holes which prevents screws or bolts falling into a pipeline system, but the complicated retaining ring can be used only on a stationary body and not on a movable valve member, such a retaining device does not have a self lock, so any reaction force by a high vibration or uneven point forces by screws or bolts can cause screws loose and a seat leak. the fundamental disadvantage for axial bolting method is the direction of the seat loading is the same as that of bolting, so any disengagement between bolt thread and thread hole caused by a creep or vibration will soon amplify, many tests indicate without self lock mechanism, the bolting is not safe under high vibrations and temperature conditions.

The third field is for improving the stem seal packing. A packing device is one of those efforts shown in U.S. Pat. No. 4,886,241 to James R. Davis et al (1989) and U.S. Pat. No. 4,394,023 to Alberto L. Hinojosa (1983) disclose stem seals with graphite packing for high temperature applications, but the stem packing seals require more packing force and constant readjustment. A survey shows that 50% of the control valve failures are contributed by excessive stem packing force, the efforts to improve the stem seal are to add more stem seal packing sets, more seal force with more storing energy to both rotary and reciprocal stems. A live load packing device is one of those efforts shown in U.S. Pat. No. 5,230,498 to Charles W. Wood (1993), U.S. Pat. No. 5,503,406 to Leonard T. Armstrong (1996) and U.S. Pat. No. 5,860,633 to Ryan E. Murphy et al (1999). Those packing devices are not only expensive, inefficient and unsuitable for temperatures over 460 F, U.S. Pat. No. 6,202,668 to Robert E. Maki (2001) and U.S. Pat. No. 4,082,105 to Hebert Allen (1978) show fire-resistant stem seals. The fire-resistant stem seals are provided with a first PTFE seal and a secondary metal seal, in case of fire or temperature elevation, the secondary metal seal will replace the first PTFE seal, but in reality such a stem seal proves to be unreliable and has high leakage. In short, those prior arts in the stem seal field have common disadvantages: Inefficiency of packing loading. According to the Hook law and Poisson ratio, only about 30% of axial force in most materials is converted to radial displacements of the packing which helps fill in the gap between the stem and the packing, in addition of frictions, lower density or material creeps under high temperature, the efficiency of the conversion even becomes worse about 10-20%, so the conventional axial loadings for radial seal packing are inefficient and expensive to produce. The stem packing is one of those efforts shown in U.S. Pat. No. 4,886,241 to James R. Davis et al (1989) and U.S. Pat. No. 4,394,023 to Alberto L. Hinojosa (1983) disclose stem seals with graphite packing for high temperature applications, but the stem packing seals are subject to more packing force and constant readjustment. U.S. Pat. No. 7,004,452 to Chatufale (2006) shows C ring seal for gate valve, but it is unidirectional and not for high temperature, while U.S. Pat. Application No. 2011/0084456 A1 reveals a metal C ring with an insert for high temperature flange seal application, but the C ring only is used for static seal in flanges.

The fourth field is for improving the mechanical joint between stem and disc U.S. Pat. No. 4,483,513 to Anthony C. Summers (1984) and U.S. Pat. No. 4,828,221 to William B. Scobie (1998) disclose improved joints between a stem and a valve member, but the disadvantage is that the joints eliminate the stem axial freedom, the elimination can force thermal expansion to damage a seat or cause the stem deformation and a seat leak under high temperature, a conventional solution to the problem is to employ a key joint as shown in U.S. Pat. No. 6,079,695 to Jerry Gassaway (2000), but the key joint weakens the two hubs where the highest stress and stress concentration are located and torques are unevenly transferred, moreover the key joint requires an expensive broaching process for keyway. U.S. Pat. No. 6,029,949 to Robert Joseph Brown et al (2000) shows a plate and bolts for securing a stem on a vane, the design with the plate and bolts can further weakens the stem and vane and adds the cost for materials as well as machining, and there is a high risk of the plate and bolts falling into a pipeline system under high temperatures or high vibration conditions, such a design is prohibited in the turbine and engine systems, finally US 2008/0203346 A1 to Jianchao Shu (2008) shows the two key joints between the stem and disc, but the design cause high stress concentrations on the stem and motion loss.

The fifth field is for developing special disc or trim to reduce the noise and cavitation, for example, in U.S. Pat. No. 6,338,468 to Ogawa, et al. (2002) an enlarged section of valve body was employed to reduce cavitation, it is simple and low cost but in small opening, the cavitation still exists, many cases indicate the wall of the enlarged section is first damaged and flow penetrate the wall and cause leak, finally a valve application—is shown in U.S. Pat. No. 4,007,908 to Paul. V Smagghe.

In short, all efforts in the prior arts never address or recognize needs for replacing the axial retaining ring bolting or the laminated seat with metal and graphite stem seal and for developing full metal seat and stem seal under high temperature and fundamentally reducing the operation torque, most efforts are focused on easing the consequence rather than finding the root of cause, finally other inherent problem for butterfly valve is the upstream load support by the stem rather than the stem and seat like ball valve or gate valve, it causes unidirectional seal in most of the butterfly valves if the stem is not properly constructed.

So the flow control industry has long sought means of improving the performance of butterfly as well as rotary valve, improving the stem seal, creating a robust bidirectional seat seal, enabling the valve to handle various flow under multiple extreme conditions.

In conclusion, insofar as I am aware, no such butterfly or such rotary valve is formerly developed with fully metal sealed seat, highly reliable seat retaining device without high preload and risk of bolt falling into a pipeline system, easy manufacturing at low cost they can be used for controlling bidirectional fluid between full opening and full closed with no or less cavitation and low noise under multiple extreme conditions or severe service.

SUMMARY

This invention provides a simple, robust, reliable and versatile rotary valves; triple offset butterfly valve and ball valve for severe service or under multiple extreme conditions. This triple offset butterfly comprises a body with a flow port, a reliable, robust wedge-eccentric—thread joint/lock mechanism between a stem and a disc in a middle is provided with two wedge keys and secured by a lock plug for providing solid joint without reducing of stem strength and loss motion, the stem is disposed by means of spring bearings in the body, spring bearings are disposed in the bearing hole in the body to compensate valve assembly clearances for upstream seal as well as the thermal expansion of the stem, the full metal wave seats are disposed between conical mating solid seat on the body or the disc for providing seals without any graphite gasket, the seats are secured by a wedge-eccentric-thread join/lock mechanism, which includes retaining ring with a wedged groove to receive three wedged lock rings between the disc and retaining ring, three lock plugs are disposed in the plug holes of the disc, each lock plug has an eccentric groove to hold each lock ring as well push the lock ring bottom up against wedge surfaces of the retaining ring by rotating the plug, in turn, the wedge lock ring is engaged with wedge surface of groove on the retaining ring is provided for pressing the wave seats, finally a setscrew is disposed in thread hole in the lock plug to prevent the lock plug from rotation. A novel metal K rings comprise an I ring inserted in a groove of the stem and two metal compression rings disposed in the stem below and above the I ring for converting a dynamic radial seal to a dynamic axial seal and providing spring load on two laminated metal packing below and above K ring under high temperature and high pressure with the leakage between 5-50 ppm.

This rotary valve can be constructed with a ball as the closure member for the applications which requires either full port or reduced port, a pair of right and left segment trims can be used for both ball valve and butterfly valve disposed between two ends of the flow port on the rotary valve body for reducing cavitation or noise, the trim comprises a segment of cylinder bar with multiple holes and a flow port and an internal surface mated with a disc or ball, such trims provides a very effective multiple flow restriction mechanism in a small opening between 0-60 degree where most cavitations happen, the trims can be installed on the body either by means of two position pins to prevent the segment trim from rotation and a step on the body edge to secure the segment trim in a valve axial direction, or by a pair of eccentric lock rings disposed a groove between the body and a groove on the trim, so as the lock rings are rotated into grooves, the thickness of rings due to the eccentric nature is increased until the both side of the ring are engaged with bottoms of the groove and to secure the trim, in case of high velocity applications, a spot welding may need on the tip of lock rings.

This valve body can be constructed for seat replaceable service on the field, so the seats on those fully weld body valve still can be replaceable without cutting the pipes or body, such inline replaceable feature is very useful for both butterfly valve and ball valve in LNG plant and refiner or gas line, the structure comprises a wedge opening on the body to receive a wedge cover with a gasket around the edge, a body gasket is provided as a secondary seal, a body ring with internal conical surface is engaged with body gasket against the substantially same conical surface of outside body and the cover, bolts and nuts are provided for securing the body and the body ring, finally a pair of wedge rings are installed to adjust axial gaps after a seat is replaced.

Accordingly, besides objects and advantages of the present invention described in the above patent, several objects and advantages of the present invention are:

(a) To provide simple highly sealable, reliable, durable seat seal assembly for multiple extreme conditions: high pressure, cryogenic or high temperature or solid particles with corrosive fluid, so such a seal seat assembly can keep good static and dynamic seals with low leakage between 5-50 ppm with low friction and operating torque without high preload and side seal.

(b) To provide a highly reliable joint/lock mechanism between seat and retaining ring for a valve, so such a valve can be operated under high vibration and high temperature condition without risk of bolts falling into a pipeline system to damage critical equipment in the downstream (c) To provide a stem seal for extreme conditions: high pressure, cryogenic or high temperature or fire-safe applications. Such a seal ring can keep good static and dynamic seals with low leakage between 5-50 ppm with low friction without constant repacking or readjustment.

(d) To provide a reliable stem/disc joint mechanism for a rotary valve, so the joint/lock mechanism can not only increase the disc and stem strength and eliminate backlash and motion loss and reduce stress concentration on stem and disc, also it can prevent stem or hub from cracking or key from falling into pipeline under vibration or quick cycle applications as well as make easy to manufacture and disassemble.

(e) To provide a valve with bearings to support a stem under high temperature, high thermal cycle and high pressure, compensate an assembly clearance and thermal expansion, or deformation under high pressure. So such a valve has a bidirectional seat seal under the extreme conditions and high pressure for ANSI class 2500.

(f) To provide a rotary valve with simple, low cost, reliable, highly efficient and adaptable flow trims, so such a valve can be used for throttling applications, it not only reduces cavitation and noise, but also provides precision flow condition and long life and high reliability for severe service.

(g) To provide a valve body with inline repairable seat feature, so a seat in the welded-end valve can be replaced without cutting out pipes or bodies and re-welding.

(h) To provide a simple, compact and safe valve for easy manufacturing, operation, installation, repairing and maintenance, so the valve becomes much greener to reduce waste, energy consumption and improve the environments.

Accordingly, besides objects and advantages of the present invention described in the above patent, several objects and advantages of the present invention are Still further objects and advantages will become apparent from study of the following description and the accompanying drawings.

DRAWINGS

Drawing Figures

| Reference Number In Drawing | |
|---|---|
| 100 | rotary valve, a, b, c, d |
| 101 | body, |
| 102 | packing bore |
| 103 | flow port |
| 105 | wedge groove |
| 106 | stem hole |
| 107 | solid seat |
| 108 | seat seal surface |
| 109 | seat recess |
| 110 | front surface |
| 111 | seat recess inward surface |
| 113 | seat opening |
| 114 | opening surface |
| 115 | body outside surface |
| 117 | position pin hole |
| 118 | step bore |
| 119 | groove |
| 120 | stem |
| 121 | I ring groove |
| 122 | keyway, 122' |
| 123 | stem surface |
| 124 | closure member assembly |
| 125 | I ring, 125', 125" |
| 126 | outside surface |
| 127 | setscrew |
| 128 | packing, 128' |
| 129 | gland |
| 130 | closure member, Disc, Ball |
| 131 | hub, 131' |
| 132 | stem hole |
| 133 | keyway, 133' |
| 134 | step boss |
| 135 | solid seat |
| 136 | seal surface |
| 137 | boss |
| 138 | back surface |
| 139 | lock slot |
| 140 | back groove |
| 141 | radial groove |
| 142 | gap, 142'142" |
| 143 | plug hole, 143' |
| 144 | retreat slot |
| 145 | key slot |
| 146 | lock plug, 146' |
| 147 | eccentric groove |
| 148 | slot |
| 149 | thread hole |
| 150 | seat ring, 150', 150" |
| 151 | Converting surface |
| 153 | back surface |
| 154 | Inward seal surface |
| 155 | outward seal surface |
| 156 | front surface |
| 157 | key, 157' |
| 158 | wedge surface |
| 159 | tongue |
| 160 | lock ring |
| 161 | base |
| 162 | wedge surface |
| 163 | retreat hole |
| 164 | ring |
| 165 | retaining ring |
| 166 | wedge groove |
| 167 | wedge surface |

-continued

| Reference Number In Drawing | |
|---|---|
| 168 | inward surface |
| 169 | Inside diameter surface |
| 170 | K ring |
| 171 | compression ring, 171' |
| 172 | outward surface |
| 174 | Inside surface |
| 175 | bearing |
| 176 | bearing inside surface |
| 177 | slot |
| 178 | spring pin, 178', 178" |
| 179 | position pin |
| 180 | trim, 180' |
| 181 | port |
| 182 | outside surface |
| 183 | mating surface |
| 184 | groove |
| 185 | eccentric lock |
| 186 | retreat slot |
| 187 | position hole |
| 188 | flow hole |
| 189 | step |
| 191 | body ring |
| 192 | internal conical surface |
| 193 | cover gasket |
| 194 | bolt |
| 196 | seat cover |
| 197 | body gasket |
| 198 | wedge support ring, 198' |
| 199 | nut |

DESCRIPTION

Figure 1:
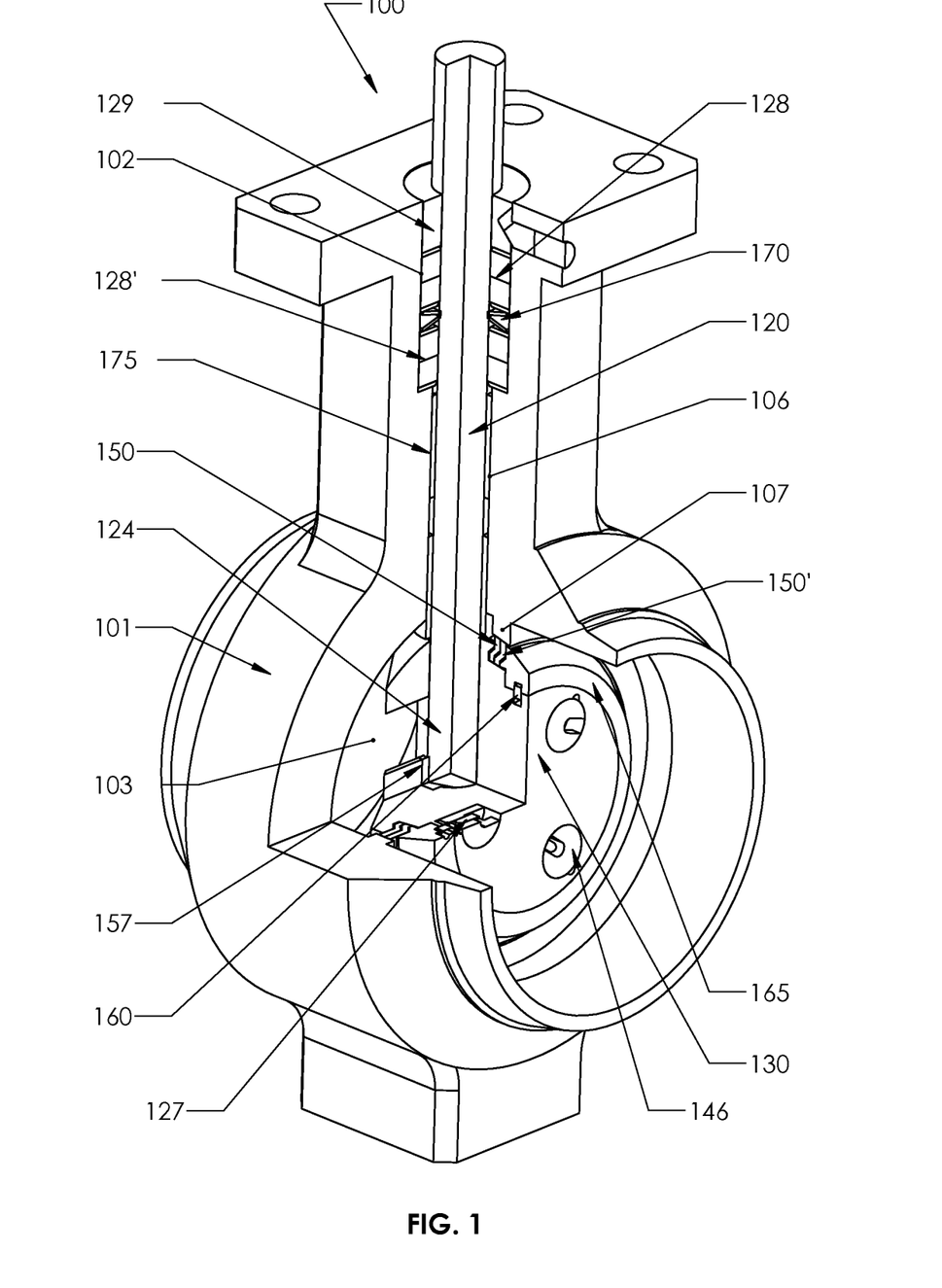
FIG. 1 is an exploded, quarter cut view of a rotary valve constructed in accordance with this invention.
Figures 2, 3, 4, 5, 6, 7:
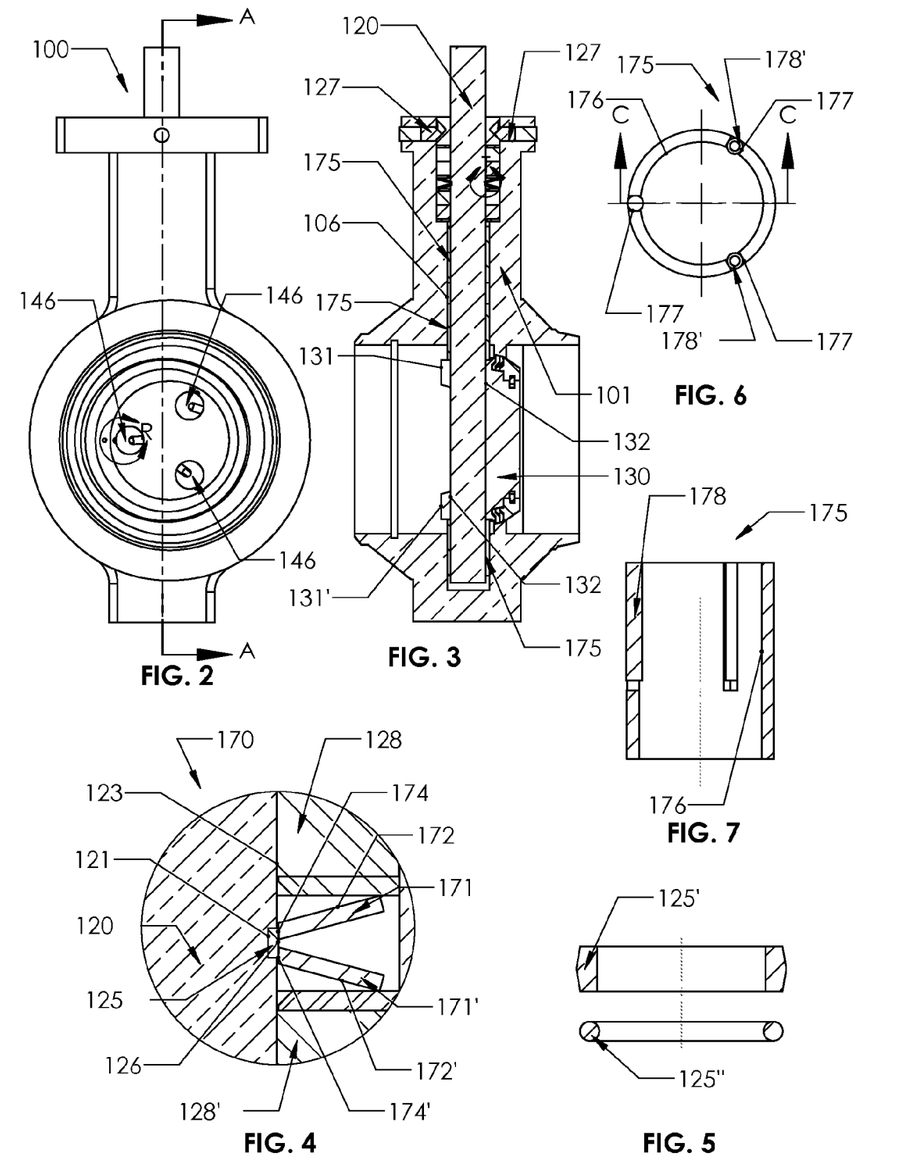
FIG. 2 is a front view of rotary valve of FIG. 1.
FIG. 3 is a cross sectional view of rotary valve of FIG. 2 along line A-A.
FIG. 4 is a detail views of rotary valve of FIG. 3
FIG. 5 is a cross sectional views of alternative I rings of FIG. 4.
FIG. 6 is a top view of a bearing in the rotary valve of FIG. 3.
FIG. 7 is a cross sectional view of bearing of FIG. 6. along line C-C.

FIGS. 1-3 illustrate a rotary valve constructed in accordance with the present invention. The valve 100 comprises a body 101 having a packing bore 102 extended to a stem hole 106 for receiving respectively gland 129, packings 128, 128' and a K ring 170, a closure member assembly 124 includes a disc 130 and a stem 120 disposed in the stem hole 106 by means of three spring bearings 175, disc 130 with wave seats 150, 150' is movably disposed in a port 103 for throttling flow fluid between closed and open positions.

Referring FIGS. 3-7, stem 120 includes a groove 121, K ring 170 comprise two compression rings 171,171' and an I ring 125 having a rectangle cross section disposed in groove 121, two compression rings 171,171' are respectively disposed below and above I ring 125, an inside cylindrical surface 174 of ring 171, an inside cylindrical surface 174' of ring 171' are tightly engaged respectively with a stem cylindrical surface 123 and an outside surface 126 of I ring 125 for providing seals as compression rings 171, 171' are pressed inwardly to each other, a cross section of I ring 125 can be constructed as a circle or with two wedge sides for large stems or as an integral part of stem 120, two laminated metal packings 128,128' are respectively disposed below and above K ring 170 for axial and radial seals. Spring bearings 175 having a cylindrical inside surface 176 are disposed in stem hole 106 with three axial slots 177 for receiving one solid and two hollow pins 178,178', stem 120 having cylindrical surface 123 is rotationally disposed in an inside surface 176 of bearings 175, when stem 120 is rotated to a closed position, bearing 175 with solid pin 178 is against the stem 120 and disc 130 for eliminating cumulative clearances among stem 120, disc 130 and body 101, in case of high temperature applications, at lease one spring pins 178' will be used to compensate any thermal expansion or deformation under load between stem 120 and bearing 175, spring pins 178' can be constructed as spiral pin or a ring with a C section.

Referring FIGS. 8, 9, 10, 11, stem 120 also comprises two wedged keyways 122,122' respectively engaged with two mating wedged sides 158,158' of keys 157,157', while disc 130 includes two hubs 131,131' having a stem hole 132 to receive stem 120 and two keyway 133,133' engaged with two keys 157,157' for transferring movements between stem 120 and disc 130, key 157' has a flat tongue 159 inserted in a slot 139 of keyway 133', a lock plug 146' having an eccentric groove 147' and a drive slot 148' is movably disposed in plug hole 143' of disc 130 to receive tongue 159, as plug 146' is rotated, a bottom of groove 147' is pressed against tongue 159 for securing a joint between stem 120 and disc 130, since plug 146' is first disposed in the plug hole 143', keys 157,157' are inserted into keyway 122,122' from both side of stem 120 as stem 120 is inserted into a middle position, groove 147' holds tongue 159, as a result, the plug 146' and key 157' are interlocked and will never fall out without dissembling the stem 120 from disc 130, while key 157 is securely disposed between keyways 157 and 133.

Figure 8:
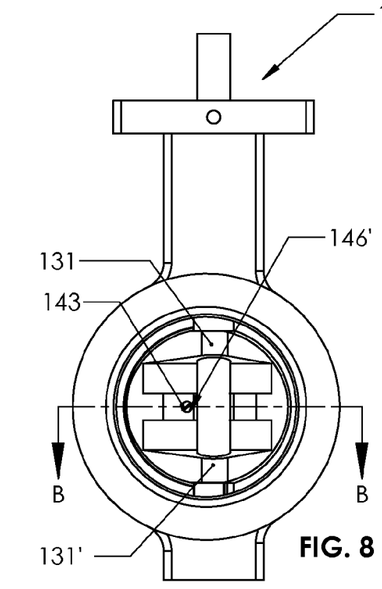
FIG. 8 is a back view of rotary valve of FIG. 1.
Figures 9, 10, 12:
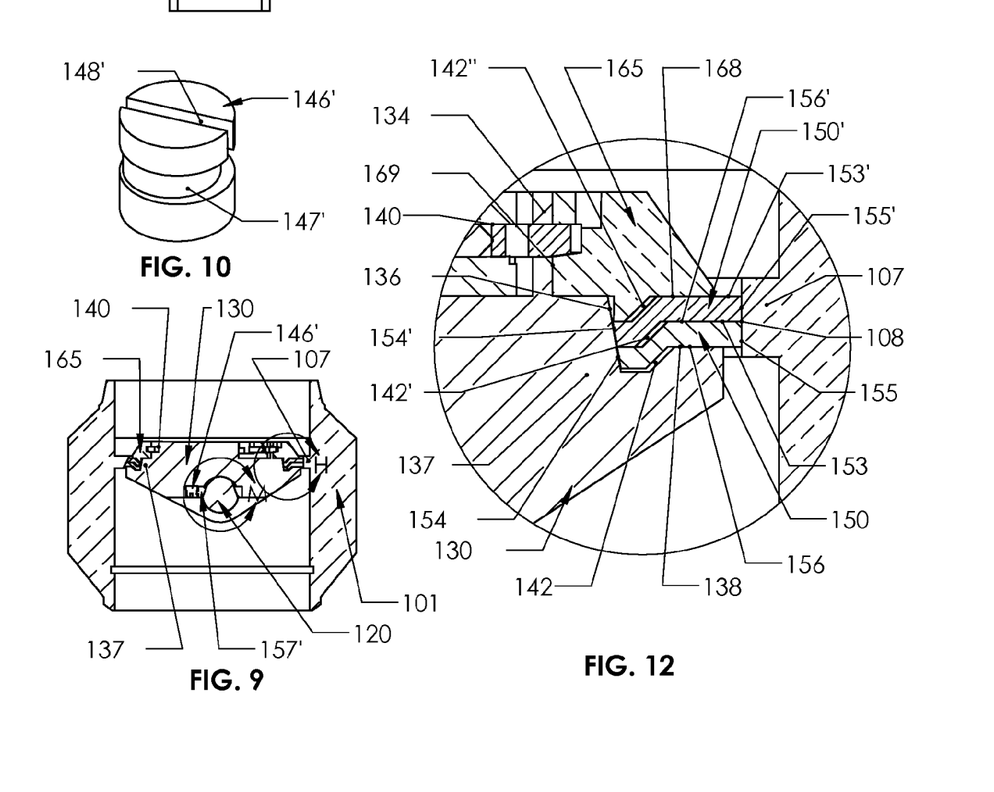
FIG. 9 is a cross sectional view of rotary valve of FIG. 8 along line B-B.
FIG. 10 is an iso view of a lock plug of FIG. 9
FIG. 12 is a detail view of rotary valve of FIG. 9
Figure 11:
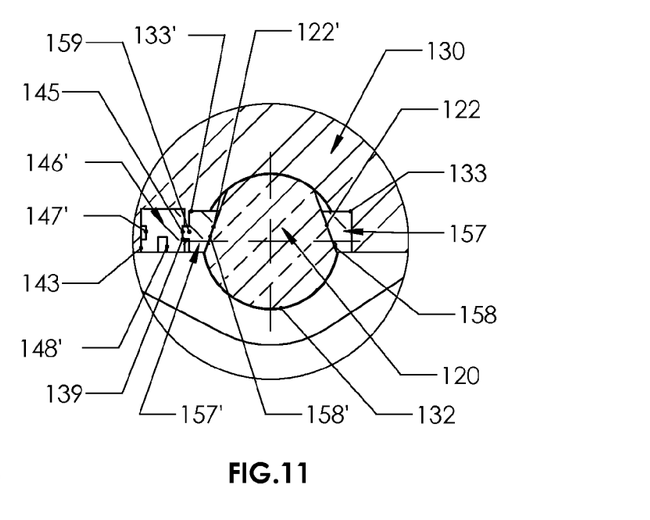
FIG. 11 is a detail view of rotary valve of FIG. 9

Referring FIGS. 8,9, 12, two wave seats 150,150' disposed between a solid seat 107 of body 101 and a conical boss 137 of disc 130 are defined respectively by inward conical surfaces 154,154', front non-flat surfaces 156,156', outward conical surfaces 155,155' and back non-flat surfaces 153, 153', front surface 156 of seat 150 is against a front non-flat surface 138 of disc 130 with a gap 142, a front surface 156' of wave seat 150' is against back surface 153 of seat 150 with a gap 142', a front surface 168 of a retaining ring 165 is against back surface 153' of seat 150' with a gap 142", as disc 130 is approached to a close position, conical outward seal surfaces 155,155' are engaged with a substantially identical angle conical surface 108 of solid seat 107 for providing seals between wave seats 150,150' and solid seat 107, in meantime, wave seats 150,150' are bended axially into gaps 142,142'142" under the radial compression, gasp 142,142'142" become smaller, conical inward seal surfaces 154,154' are engaged with a substantially identical angle conical surface 136 of boss 137 for providing seals between wave seats 150,150' and disc 130.

Figure 13:
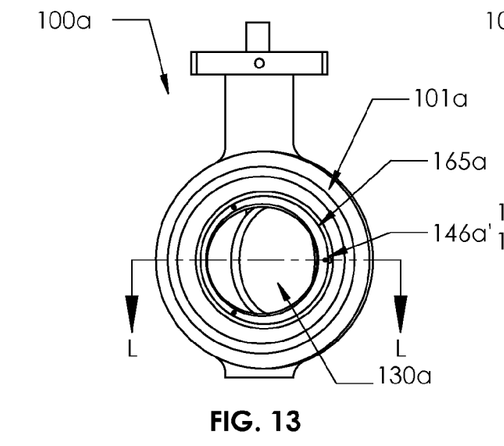
FIG. 13 is a front view of an alternative rotary valve of FIG. 1
Figures 14, 18:
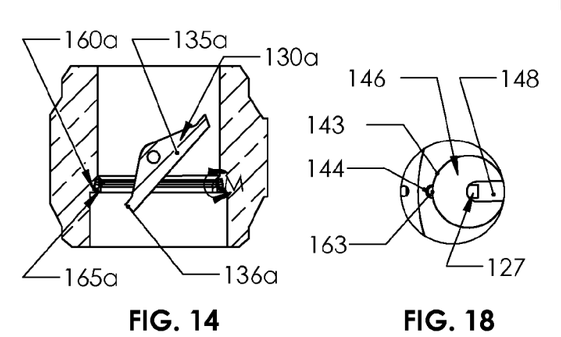
FIG. 14 is a cross sectional view of rotary valve of FIG. 13 along line L-L.
FIG. 18 is a detail view of rotary valve of FIG. 16
Figure 15:
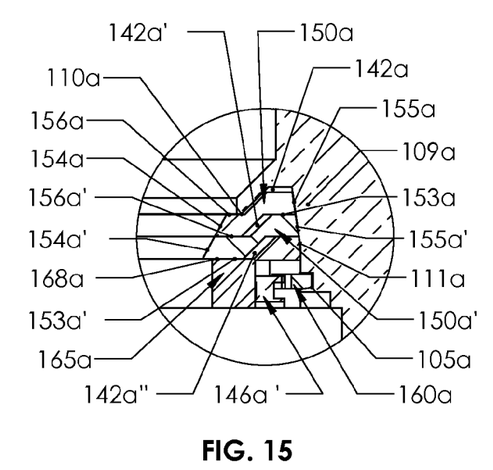
FIG. 15 is a detail view of rotary valve of FIG. 14
Figure 16:
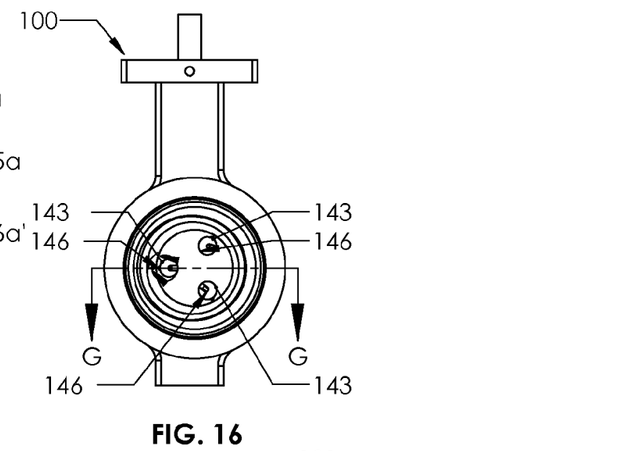
FIG. 16 is a front view of rotary valve of FIG. 1
Figure 17:
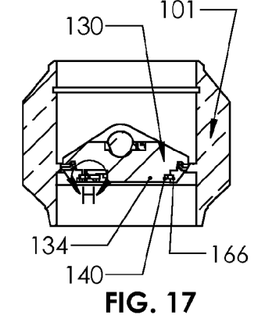
FIG. 17 is a cross sectional view of rotary valve FIG. 16 along line G-G
Figure 19:
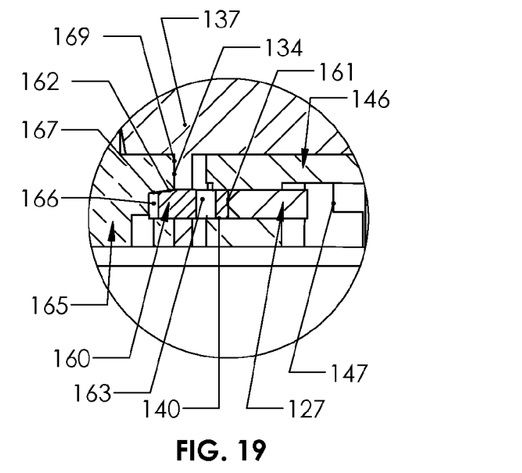
FIG. 19 is a detail view of rotary valve of FIG. 17
Figure 20:
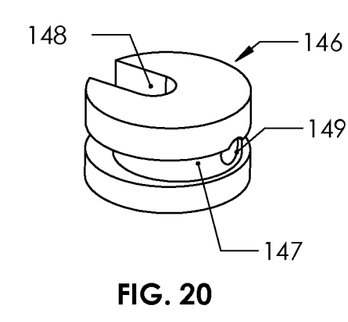
FIG. 20 is an iso view of a lock plug of FIG. 19
Figure 21:
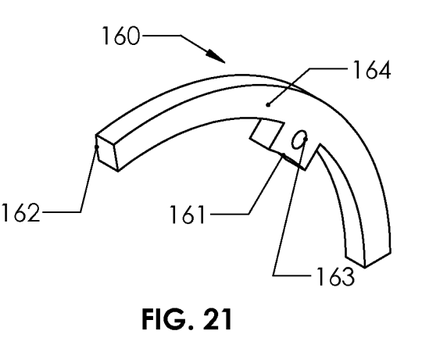
FIG. 21 is an iso view of a lock of FIG. 19

Referring FIGS. 13,14,15, a rotary valve 100a is based on valve 100, valve 100a has a body 101a including a recess 109a, two wave seat 150a,150a' disposed between a solid seat 135a of a disc 130a and recess 109a are defined respectively by inward conical surfaces 154a, 154a', front non-flat surfaces 156a, 156a', outward conical surfaces 155a, 155a' and back non-flat surfaces 153a,153a', front surface 156a of wave seat 150a is against surface 110a with a gap 142a, front surface 156a' of seat 150a' is against back surface 153a of seat 150a with a gap 142a', a front surface 168a of a retaining ring 165a is against back surface 153a' of seat 150a' with a gap 142a", as disc 130a is approached to an open position from an closed position, inwardly conical seal surfaces 154a,154a' are away from substantially identical conical surface 136a of solid seat 135a, at meantime wave seat 150a,150a' are tend to return to original position, while gaps 142a, 142a' and 142a" become larger and are trended to return to original shape without the radial compression, while conical outward seal surfaces 155a,155a' are engaged with a substantially identical conical surface 111a of boss 109a for seals.

Referring FIGS. 9,12,16,17,19, 20,21, a step cylindrical boss 134 of disc 130 has three substantially identical plug hole 143 respectively with three retreat slots 144 equally circumferentially spanned and extending to groove 140, each of three plugs 146 having an eccentric groove 147, a drive slot 148 and a thread hole 149 is disposed in plug hole 143, each of three lock rings 160 having a ring 164 with a wedge side surface 162 and a base 161 and a retreat hole 163 is movably disposed in groove 140, each base 161 is extend into plug hole 143 and groove 147, retaining ring 165 having an inside cylindrical surface 169 disposed on boss 134 of disc 130 has front surface 168 against wave seat 150' and a groove 166 having a wedge side surface 167, as plug 146 is rotated, a bottom of groove 147 is against base 161 outward, as a result, lock ring 160 is moving into groove 166, wedge side surface 162 of lock ring 160 is engaged with a mating wedge side surface 167 of groove 166 of retaining ring 165 for converting a radial movement to an axial movement and securing seat 150', after plug 146 is rotated fully against to base 161, setscrew 127 in thread hole is tightened for preventing plug 146 from rotation, since an angle of wedge side 162 is substantially the same as that of wedge side surface 167 and is small enough to have self lock effect, because lock rings 160 is inserted into groove 166 after the plug is installed, plug 146 and lock ring 160 are interlocked, setscrew 127 is longer than slot 148, so even plug 146 is in full loosed condition, non of plug 146 or setscrew 127 will fall out, retaining ring 165a, lock plugs 146a and lock rings 160a in FIG. 15 has the same function here.

Figure 22:
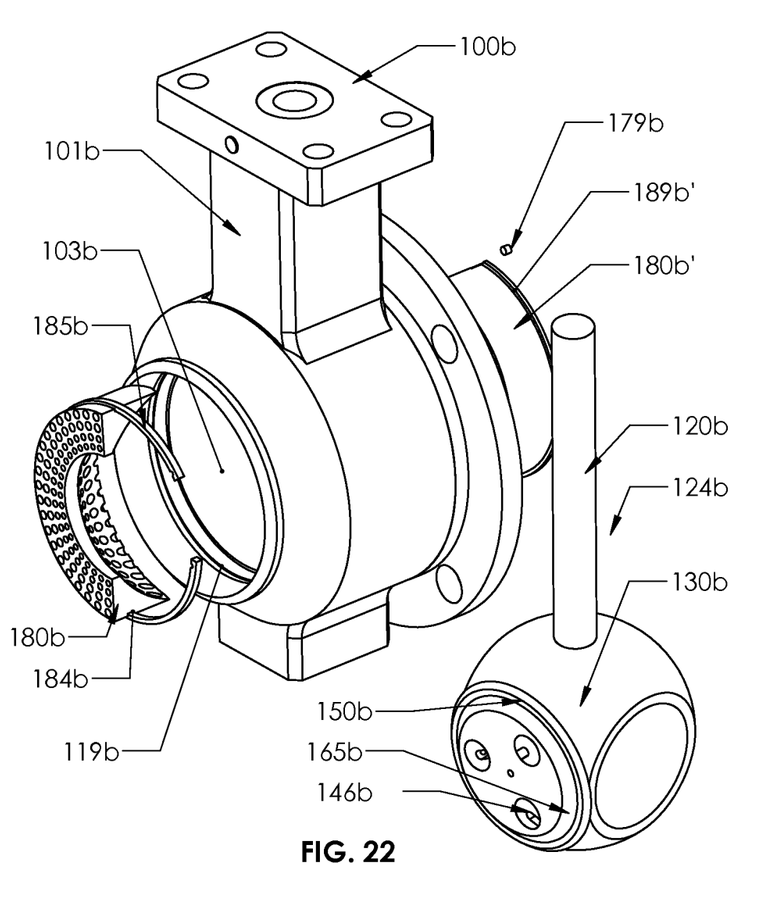
FIG. 22 is an exploded view of an alternative rotary valve of FIG. 1
Figures 23, 24, 25, 26, 27:
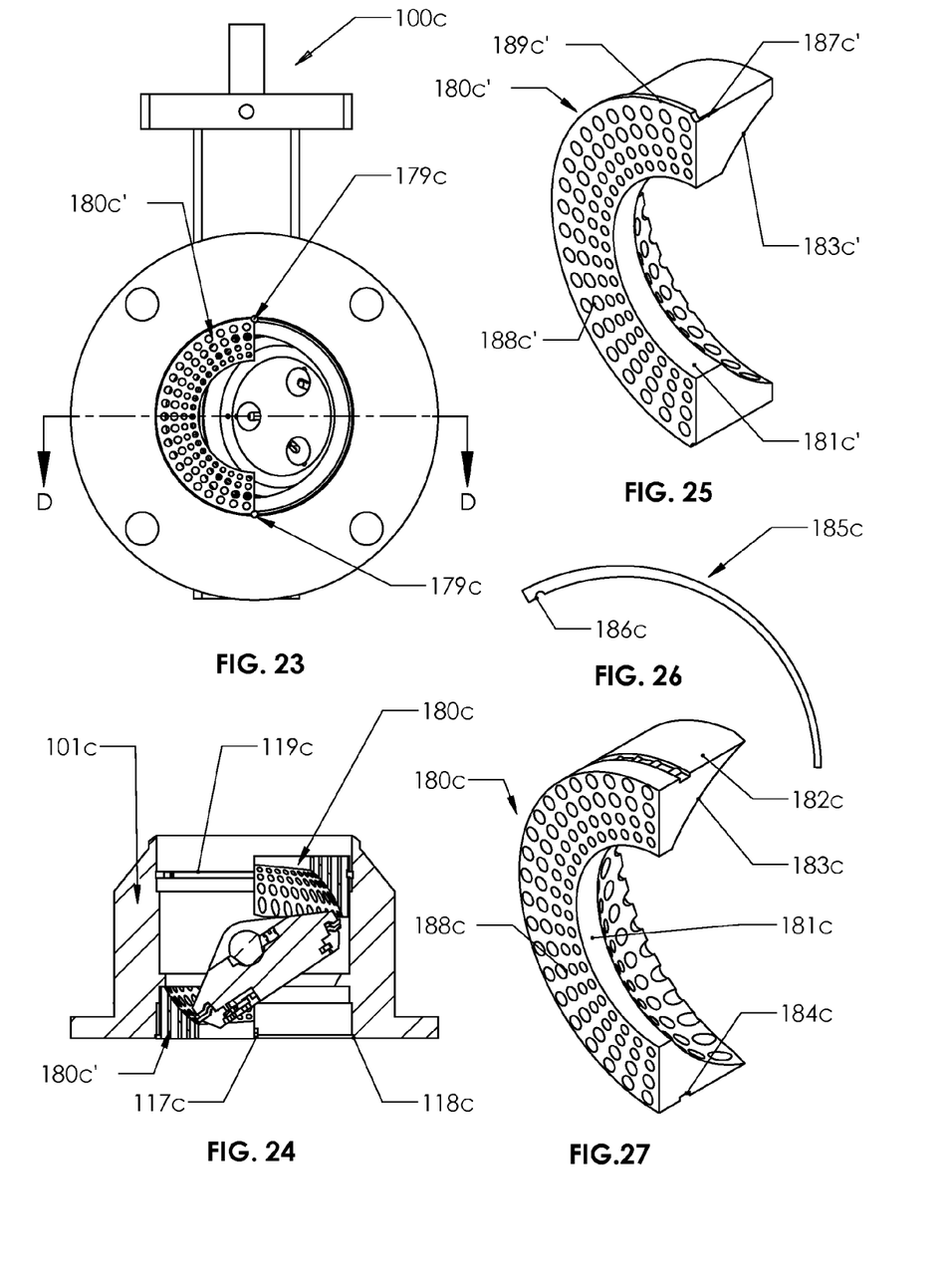
FIG. 23 is a front view of an alternative rotary valve of FIG. 21
FIG. 24 is a cross sectional view of rotary valve of FIG. 23 along line D-D.
FIG. 25 is a an iso view of a trim of FIG. 24
FIG. 26 is a front view of an eccentric lock of FIG. 24
FIG. 27 is an iso view of a trim of FIG. 24
Figure 28:
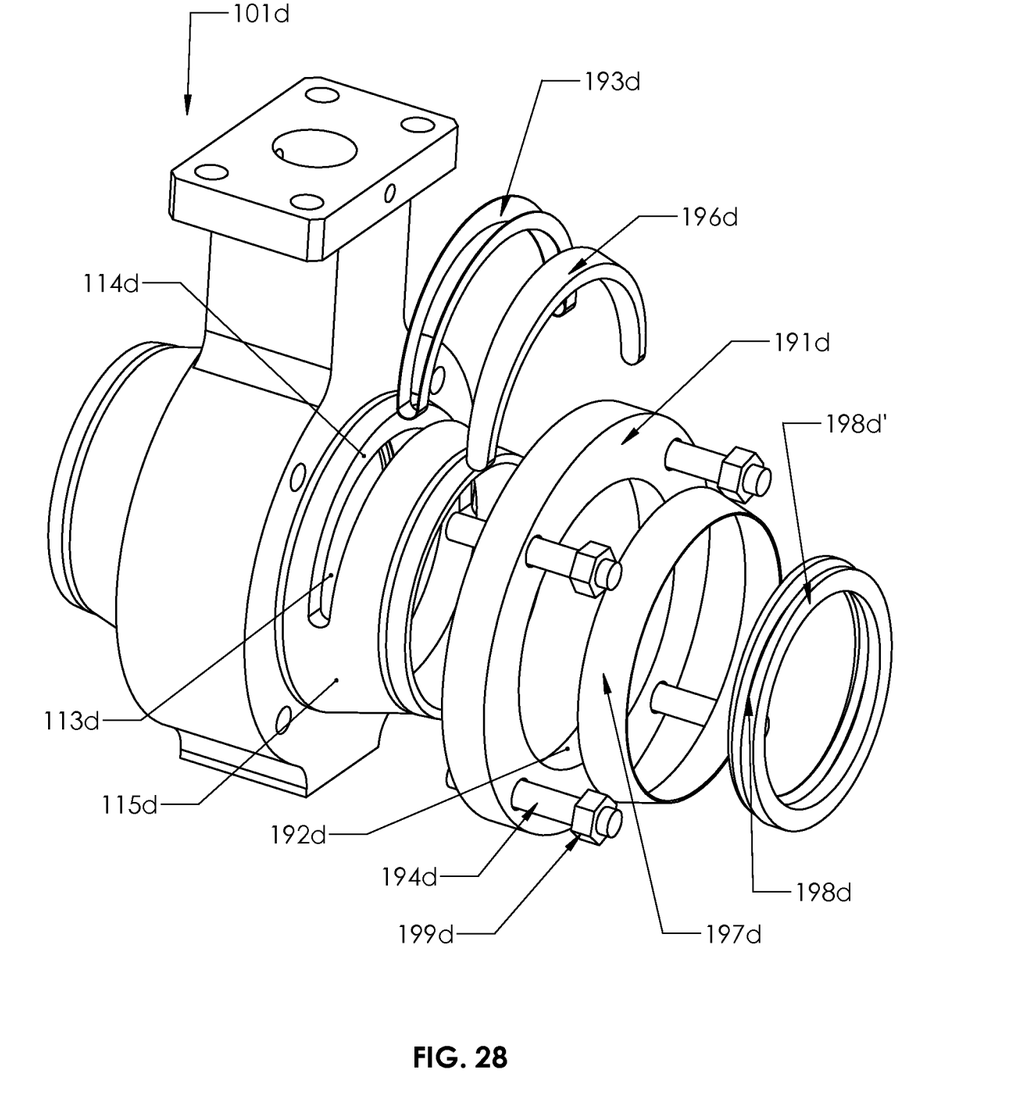
FIG. 28 is an exploded view of alternative valve body of FIG. 1.
Figure 29:
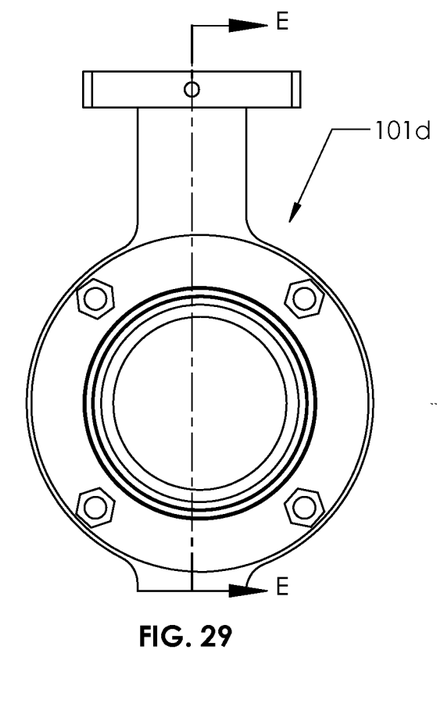
FIG. 29 is a side view of valve body of FIG. 28
Figure 30:
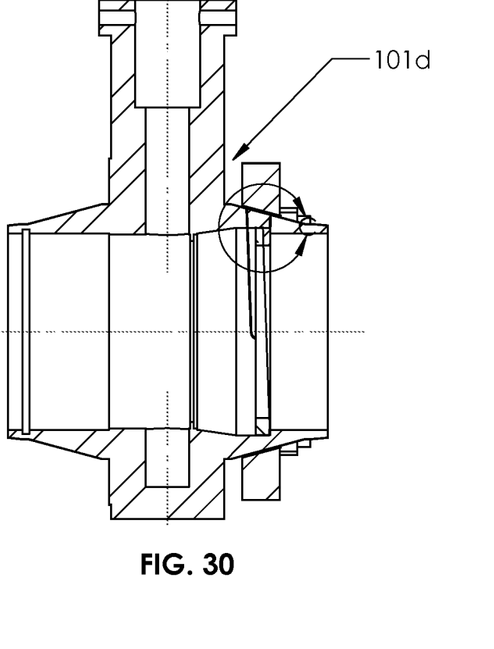
FIG. 30 is a cross sectional view of valve body FIG. 29 along line E-E.
Figure 31:
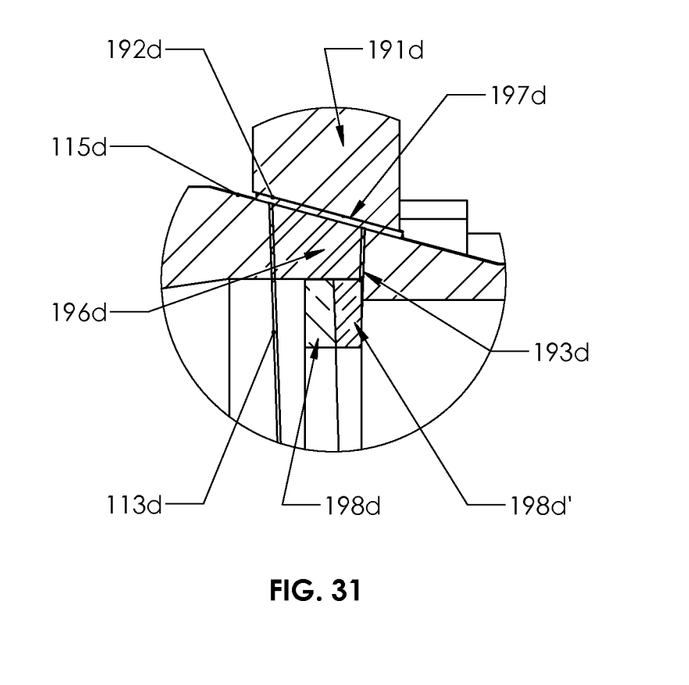
FIG. 31 is a detail view of valve body of FIG. 30

Referring FIG. 22, a rotary valve 100b based on valve 100 comprises a body 101b, a closure assembly 124b with a stem 120b and a ball 130b and a wave seat 150b secured by retaining ring 165b and lock plugs 146b is disposed in body 101b for controlling flow in a flow port of 103b, trims 180b, 180b' are disposed in body 101b for reducing cavitation and noise, trim 180b with a groove 184b is installed in a flow port 103b and secured by two eccentric lock rings 185b disposed in groove 119b, while trim 180b' is installed in flow port 103b and secured by two pins 179b and step 189b Referring FIGS. 23,24,25,26,27, a rotary valve 100c based on valve 100 is used for reducing cavitation and noise, valve 100c comprises a body 101c having a flow port 103c with a groove 119c, two position pins 179c, two eccentric segment lock rings 185c and a pair of trims 180c,180c', flow port 103c has a groove 119c and a step bore 118c having two position pin holes 117c in an opposite direction, segment cylindrical left trim 180c' is disposed in flow port 103c by engagement between cylindrical step 189c' and mating step bore 118c for preventing trim 180c from moving inwardly, two pins 179c are respectively disposed between the pin holes 117c and position holes 187c' of trim 180c' for preventing rotary movements of trim 180c', trims 180c' also comprises a flow opening 181c' extended to spherical mating surface 183c' having multiple through holes 188c', said closure member 130c is rotated against the mating surface 183' for throttling a flow and reducing cavitation and noise, while segment cylindrical right trim 180c having a groove 184c is disposed in flow port 103c by means of a pair of eccentric lock rings 185 disposed between groove 184c and groove 119c for preventing trim 180c from movement, as ring 185c with a retreat slot 186c is rotated, a bottom and a top of eccentric ring 185c will press bottoms of grooves 119c 184c for securing trim 180c, in case of high flow rate, ring 180c can be spot-welded with body 101c, trims 180c also comprises a flow opening 181c extended to a spherical mating surface 183c having multiple through holes 188c, said closure member 130c is rotated against the mating surface 183c for throttling flows and reducing cavitation and noise.

Referring to FIGS. 28-31, a valve body 101d is used for inline seat repairable application without cutting welded pipe or valve body, valve body 101d based on valve body 101 comprises a conical outside surface 115d with a seat wedge opening 113d for replacing a seat (not shown) and a mating wedge cover 196d disposed in opening 113d with a cover gasket 197d for providing seals, a body ring 191d is mounted on outside surface 115d and secured by bolts 194d and nuts 199d, body ring 191d comprises a conical outside surface 192d engaged with a secondary gasket 197d and substantially identical angle conical surface 115d for providing seals and reinforcing strength of body 101d, a pair of mating wedged seat support rings 198d, 198d' is inserted into body 101d, support rings 198d, 198d' are rotated for supporting and adjusting the seat horizontally.

Advantages

1. Reliability. (1) High operational reliability is based on the closure member which is only one moving part secured by wedge-eccentric lock device between the disc and stem; (a) three spring bearings compensate any deformation of the stem under load and absorber any impact load on the stem and reduce the stress (b) the wedge-eccentric joint/lock device between disc and stem evenly distributes load between middle of the disc and middle of the stem without stress concentration and backlash reduce the hub's overstress which happen in most butterfly valves, even the stem is broken or under vibrations, the keys will not fall into the flow port (c) the wedge-eccentric-thread joint/lock device between retaining ring and seat is designed to hold the seal rings evenly and securely, there is an interlock function between lock ring and lock plug, the lock plugs will not fall into the flow port if the lock ring is broken or loosen up (2) high sealing reliability is based on (a) the wave seal rings, each metal wave seal ring has independent outward and inward seals, seal force is self balanced without preload, side load or side seal (b) K ring stem seal has self energized K ring and pressure/weight balanced laminated ring packing, the weights of stem and disc pushes the pair of compression ring down to help seal, while internal pressure pushes the pair of compression ring up to help seals, a pair of packing is disposed top and button of K ring is made of laminated metal ring or laminated graphite with metal (3) the redundancy for the seal system can be 2 to 6 as number of seal ring and packing increase, so it can be used for critical applications like jet, turbine engines air throttling or subsea flow controlling, there is no valve ever developed which has such a high level of reliability like this valve in this invention 2. Sealability. The triple offset mechanism only reduces or eliminates the rubbing between seat and closure member between closed and open positions, whether or not it can seal at closed position is other matter. For the first time in the metal butterfly valve history, the wave seat finally resolve the foundational issue for the metal seal butterfly valve, this valve is fully metal-sealed in both static and dynamic manners with ANSI Class VI leakage or bubble tight seal between ANSI class 150-4500, there is no temperature barrier or limit by seal materials like graphite, the seal capacity can take on working temperature between −250 F to 1450 F and to more with highly oxidative fluid or fluid with solid particles, while stem leakage can be between 3-50 ppm with seal ring fine surface 16 RMS or special coatings gold, silver and nickel, since the seal assembly in the valve is self energized, compensated and pressure assistant seal, the all seal materials can be the same, there is no constant local adjustment for the whole valve.

3. Durability. It is related to four wearing compensation factors between the two parts (1) the novel metal spring bearings compensate any wearing between stem and bearing and absorber impact force due to opening and closing and prolongs life of stem (2) K ring with laminated metal packing provides a forever seal mechanism, any wearing between K ring and packings is compensated by self energized compression ring, downward force caused by weights of stem and disc and upward force caused by internal pressure (3) the wave seat seal acts as a disc spring to store torsion energy when it is approached to closed position and release torsion energy when it is approached to open position, as result the wearing and tearing due to the friction can be further reduced, the operating torque is only 50 to 65% of conventional metal butterfly operating torque, moreover the wave seat acts as a self balanced spring to compensate any wearing on the inward surface or outward surface within a limitedly known range of torque, while conventional metal seal butterfly valves act as an energy dissipater both in closing and opening processes, so the torsion energy can not be destroy or created, so the energy become heat and damages the seat in both closing and opening by forms of friction and heat, in meanwhile, all seals and spring bearing are self energized to compensate any wearing (4) non backlash key joint between the stem and disc eliminates any wearing between them, further the join comes with interlock and falling proof mechanisms, with all benefits of the invention, the valve can last 5 to 30 years without replacement or readjustment and away beyond any existing valve life in the valve industries 4. Efficiency. High efficiency comes from two aspects; operation and maintenance (1) with a pair of left and right replaceable trims for reducing noise and cavitations in between 0-60 degrees where most likely noise and cavitations happen, the capacity of this valve with the trims only reduce by 20% in comparison with 50 to 60% of capacity reduction for the same size control valve with noise and cavitation full trims, the trims can be easily replaced and installed between flange ends with pins or with eccentric lock rings and with triple offset ball, the valve can handle full port or reduced port applications (2) the inline repairable body is other advantage to keep cost down, the opening cover is cut from the original body, only things need are the gaskets and taped cover ring, wave seat rings can be easily replaced with seat wedge adjustable ring to secure the seats, yet the body is robust looks beautiful unlike conventional inline repairable body, in short, this invention enable the butterfly valve to break the ANSI class 1500 and 2500 barrier as good options to replace the high pressure ball and gate valve with compact and robust body with the weights about 40% of the same size ball valve weights or 70% of the same size gate valve.

Conclusion, Ramifications and Scope

The present invention provides a revolutionary solution for fully metal to metal seal rotary valves, the wave seat in this invention finally solve the metal to metal seal problem, it complete changes the conventional rotary metal seal, there are three distinguish differences between the conventional laminated seat and the wave seat (a) the wave seat completely eliminates graphite and the glue, so it breaks the temperature limit beyond 850 F for both dynamic and static seals, specially in jet or rocket engine applications where it is used for throttling high temperature, highly oxidative flows (b) each wave seal ring has a balanced, independent inward and outward seals and act as a reverse disc spring, it store and release torsion energy unlike the conventional triple offset butterfly valve as an energy dissipater, it not only reduces the torque by 40% and wearing, but increase life of the wave seal ring, while the conventional laminated seat has metal rings glued with graphite rings together and only one layer first or last to prevent leak in inward or outward seal seals, if the seal layer leaks, the whole seat will leak, while each wave seal ring has independent seals, based on location, front and back seat can be harder to handle fluid with the particle and buildup and provide good dynamic seals, while middle wave seal ring can be flexible to good static seals, so it be used for both throttling and shutoff (c) the wave seal ring has non-flat front and back surfaces without pre-side load and side seals, so any open or closed operation will not generate much friction or heat between the wave seal rings, such feature greatly increase the sealability as well as the life, the three features are co-existing, without one, the other two cannot exist, with the features the metal seal rotary valve finally can compete against conventional ball valve as well as gate valve at high pressure/temperature applications and severe service, while both gate and ball valve still struggled with unsolvable rubbing problem and tough metal seal issues for special applications where constant replacement of seat is impracticable like subsea devices, nuclear power plants. Finally, wave seats can installed on both the disc and body at the same time, so the replacement will be much cheap and easy in highly erosive flow applications or under most severe conditions, while it is required that the ANSI class VI leakage, the body and disc will not be replaced but the wave seat does, even wave seats to be replaced can last 5 to 30 years, the wave seat can maintain the class VI seal without replacement, second is outward and inward balanced surface seals, such a seal has no any back seat leak, when wave seat at open position is not under compression, there is no seal need, when wave seat at a closed position, the seal force is balanced by inward and outward surfaces, while the seal force in the conventional metal seal butterfly is weakening the graphite side seal and preload to maintain the seal and unbalanced constantly The present invention provides a long sought solution—a novel wedge-eccentric—thread joint/lock mechanism to two fundamental problems; one is bolting joint between seat and retaining ring, other is key/pin joint between stem and disc in the conventional valve (a) This wedge-eccentric-thread joint/lock mechanism completely change the way of joint/lock between seat and retaining ring (1) 3 or 4 of lock rings to replace 4 to 36 of bolts for securing the retaining ring in the triple offset valve, the locking rings not only reduce the machining time and parts, risk of number of un-tighten bolts, but increase contact area about 3 to 4 times and the reliability of the joint by evenly distributing compression force on the retaining ring (2) the irreversible, redundant, independent wedge-eccentric join/lock mechanism to replace reversible, multiple, non-independent bolting join/lock mechanism, each wedge-eccentric join/lock mechanism is operated by a chain of function of setscrew for preventing rotation of lock plugs, the friction amplified by special surface textures or coatings between the lock plug hole and lock plug for preventing rotation of lock plugs, the wedge engagement with self lock angle between lock ring and groove of the retaining ring for preventing radial inward movement of lock ring, three or four wedge-eccentric-thread joint/lock mechanisms provide three or four redundancies of joint/locking, so any failure of one of the wedge-eccentric-thread join/lock mechanisms will not effect the other mechanisms, any failure of each wedge-eccentric-thread joint/lock mechanisms against the seat has to be accomplished by a series of actions of loosened setscrew, rotation of lock plug, inwardly radial movement of lock ring at the same time, but such a possibility is next to zero, with such high reliability, the valve can be used even under multiple extreme conditions such as a high vibration and high temperature like turbine engine applications due to different natures between wedge and eccentric mechanisms (b) This wedge-eccentric-thread joint/lock mechanism provides other solution for joint between stem and disc, with the middle balance keyways on the disc and two wedges on the stem, the wedge key joint evenly distributes the loading between hubs as compression, because of the wedge engagement between stem and keys, the stem no longer has high stress concentration, the clearance between stem and keys become one dimension unlike conventional keyway with two clearance in X and Y dimensions, the lock plug engaged with the wedge key on one side or two side can eliminated the clearance between stem and keys to prevent loss motion and backlash, which is very important for automation control, in term of manufacturing process, cross milling the wedges on the stem is much easier and lower cost than the broaching or position milling keyway on the stem, moreover, wedged key will not fall in a pipeline system even under a loosened condition, the load under pressure is shifted from the disc hubs and stem hub joint in the conventional butterfly valve to the center strong section of the disc and the stem, with the self lock angles, friction amplified texture surfaces and anti-loose screws, no screws will not loosen because of vibration or reaction forces, moreover, all bases are constantly engaged with grooves, length of setscrew is longer than that of slot, so no lock plug or setscrew will fall out, more importantly the wedge-eccentric-thread mechanism can be used for any other valves such as plug valves, ball valve, control valve and gate valves.

The invention provides a breakthrough stem seal concept, just an opposite way to wave seat seal, it converts a dynamic radial seal to an dynamic axial seal, K ring 170 converts a radial seal on stem 120 to an axial seal between compression rings 171,171' and packings 128,128', according to hook law and Poisson ratio, preload on an axial seal is about ¼ of a radial seal, the conventional large gland, large bolts and exceed load are no longer needed in an axial seal, it is fire safe by nature, compression rings 171,171' are metal, I ring 125 can become of part of the stem or made out of any material, metal, graphite, PTFE, in addition, since compression rings 171,171' are fixed with stem 120 under compression, it acts a soft stem holder and reduce wearing on seats 150,150'.

Other problem the invention solves is bidirectional seal, many valve makers claim that their triple offset valves are bidirectional, in fact when the valve is used for upstream seal, most valves will leak due to nature of the design and cumulative clearances, but with spring bearings 175 in this invention, when valve 100 is used for upstream seal, the spring bearing 175 with three pins is installed in stem hole, one solid pin is disposed in flow port direction, there are two spring pins installed in two opposite directional slots, so stem 120 is at an open position, stem 120 is rotated freely in the bearings, when stem 120 is at a closed position, all clearances are pressed against solid pin direction, while spring bearings with at least one spring pin can be used for high temperature applications, they will compensate thermal expansion of bearing 175 as well as stem 120.

The left and right trims in this invention provides a simple, low cost, flexible and effective solution for noise/cavitation reducing, it comprises a segment cylindrical bar having multiple holes, internal mating surface and flow port, the novel flexible connecting methods and the compact half cylindrical structure provide a wide applications, either with step bore and two position pins for flange, lug and wafer style bodies or eccentric lock ring disposed in two grooves on body and trim for long pattern bodies, they can be used either for retrofit with additional flanges, where severe cavitation happens or complete new valves, the trims not only save lot of material in comparison with conventional trims either complete cylindrical trim or a disc with an integral part of trims, but also provide more flow restriction where cavitation happens, more flow space where restricting flow is unnecessary, the multiple flow holes with internal mating surface provide a very effective way of dissipating the flow energy between fluid—solid interaction and reduce the velocity and noise.

Finally the inline seat repairable body is other novel feature, it can save million dollars for fully welded valve either butterfly valve or ball valve, in most situations, only the seat is damaged, the seat cost is a small percentage of total cost of valve, but whole valve must be replaced, but with this feature, million valves will be saved, it is constructed as standard valve body with additional cutting, opening cover from original body will be reused along with gasket, body ring with a secondary gasket is provided for sealing and reinforcement, a comparison test indicates wedge opening structure is stronger than the conventional flat top openings by 15 to 30% and less leakage.

Although the description above contains many specifications, these should not be construed as limiting the scope of the invention but as merely providing illustration of some of the presently preferred embodiments of this invention.

Thus, the scope of the invention should be determined by the appended claims and their legal equivalents, rather than by the examples given.

I claim:

1. In a fluid related device comprising at least one seat assembly, a body assembly having a body, a closure member assembly movably positioned between said seat assembly and said body assembly, said closure member assembly has a closure member and a retaining ring assembly, said closure member has a boss defined by a cylindrical surface with a groove and a conical surface for engaging with a mating inside diameter conical surface of said seat assembly, said retaining ring assembly comprising an eccentric lock plug assembly, a locking ring assembly and a retaining ring, said retaining ring is defined by a conical outside surface, a cylindrical inside diameter surface engaged with said boss of said closure member, a front surface defined by said boss and said seat assembly, said retaining ring having a wedge groove on said inside diameter surface, defined by a conical surface with an angle less than 13 degree and a surface finish at least 63 RMS, said lock ring assembly is positioned between said wedge groove and said groove on the said boss, said lock ring assembly including a lock ring defined by a cylindrical inside diameter surface and a mating wedge surface engaged with said conical surface of said wedge groove for converting radial movements of said lock ring to axial movements of said retaining ring for securing a position of said seat assembly, said lock ring including at least two segments, each of said segments respectively including a base on said inside diameter surface and a retreat hole on said base, said closure member having at least two plug bores, each of said bores respectively extending to said groove and having a retreat slot for accessing said retreat hole, said eccentric lock plug assembly has at least two cylindrical lock plugs and two setscrews, each of said plugs respectively disposed in said plug bore of said closure member, said plug having an eccentric groove engaged with said base of said segment for locking engagements between said base and said eccentric groove by rotating said plug, said eccentric groove having an open slot extending to a thread hole to receive one of said setscrews for locking a rotary position of said plug by threading said setscrew against an inside diameter surface of said bore, each of said setscrews is respectively longer than said slot for preventing said setscrew from falling out of said slot, said retaining ring assembly comprising said retaining ring, three of said segments of said lock ring, three of said eccentric lock plugs with three of setscrews, said seat assembly and said closure member with three of said bores having (a) securing means for securing a pre-setting position of said seat assembly with said closure member (b) multiple anti-loose means for securing engagements between said seat assembly and said closure member, between said seat assembly and said retaining ring, between said retaining ring and said locking ring, between said plug and said locking ring, between said plug and said setscrew and between said plug and said closure member.

2. The device of claim 1, wherein said body assembly comprising a retaining ring assembly, said retaining ring assembly has an eccentric lock plug assembly and a locking ring assembly and a retaining ring, said body having a recess defined by a cylindrical surface and a conical surface for engaging with a mating outside diameter conical surface of said seat assembly, said retaining ring is defined by a conical inside surface, an outside diameter surface engaged with said recess of said body, a front surface defined by said recess and said seat assembly, said retaining ring has a wedge groove on said outside diameter surface, defined by a conical surface with an angle less than 13 degree and a surface finish at least 63 RMS, said lock ring assembly is positioned between said wedge groove and a groove on the said recess, said lock ring assembly including a lock ring defined by an outside diameter surface and a mating wedge surface engaged with said conical surface of said wedge groove for converting radial movements of said lock ring to axial movements of said retaining ring for securing a position of said seat assembly, said lock ring including at least two segments, each of said segments respectively including a base on said outside diameter surface and a retreat hole on said base, said body having at least two plug bores, each of said bores respectively extending to said groove and having a retreat slot for accessing said retreat hole, said eccentric lock plug assembly has at least two cylindrical lock plugs and two setscrews, each of said plugs respectively disposed in said plug bore of said body, said plug having an eccentric groove engaged with said base of said segment for locking engagements between said base and said eccentric groove by rotating said plug, said eccentric groove having an open slot extending to a thread hole to receive one of said setscrews for locking a rotary position of said plug by threading said setscrew against an inside diameter surface of said bore, each of said setscrews is respectively longer than said slot for preventing said setscrew from falling out of said slot, said retaining ring assembly comprising said retaining ring, three of said segments of said lock ring, said seal assembly, three of said eccentric lock plugs with three of said setscrews and said body with three said bores having (a) securing means for securing a pre-setting position of said seat assembly with said body (b) multiple anti-loose means for securing engagements between said seat assembly and said body, between said seat assembly and said retaining ring, between said retaining ring and said locking ring, between said plugs and said locking ring, between said plug and said setscrew and between said plugs and said body.

3. The device of claim 1, wherein (a) said closures member assembly including at least one plug bore on said closure member and one base (one tongue) movably inserted into said plug bore and one eccentric lock plug assembly, said eccentric lock plug assembly includes a cylindrical plug positioned in said plug bore, said plug having an eccentric groove on an outside diameter surface of said plug engaged with said base for converting rotary movements of said plug to linear movements of said base, said plug also having one of slot profiles including a slot on a top of said plug for rotating said plug and an open slot on a side of said plug extending to a through thread hole, said eccentric lock assembly having a setscrew inserted to said thread hole against a wall of said bore for securing said plug positions, said setscrew is longer than said open slot for preventing said setscrew from falling out of said slot (b) said body assembly including at least one plug bore on said body and one base (one tongue) movably inserted into said plug bore and one eccentric lock plug assembly, said eccentric lock plug assembly having a cylindrical plug positioned in said plug bore, said plug having an eccentric groove on an outside diameter surface of said plug engaged with said base for converting rotary movements of said plug to linear movements of said base, said plug also having one of slot profiles including a slot on a top of said plug for rotating said plug and an open slot on a side of said plug extending to a through thread hole, said eccentric lock assembly having a setscrew inserted to said thread hole against a wall of said bore for securing said plug positions, said setscrew is longer than said open slot for preventing said setscrew from falling out of said slot.

4. The device of claim 1, further including at least one bearing assembly, said body having at least one bearing bore, said closure member assembly having at least one stem, said bearing assembly positioned between said bearing bore and said stem has an inside diameter surface and an outside diameter surface and at least one pin, said pin having one of types including a solid pin, a spring pin, a hollow pin, a spiral pin, a pin with a limited switch, said stem having an outside diameter surface rotatably engaged with said inside diameter surface of said bearing with clearances, said bearing having said outside diameter surface engaged with said bearing bore with a fit and at least one vertical slot defined by two parallel surfaces between said outside surface and said inside surface of said bearing for making said inside diameter surface to be flexible against said stem and receiving said pin, two said bearing assembly respectively received three of said pins including one of said solid pin, two of said spring hollow pins disposed between said stem and said bore of said body having (a) sealing securing means for securing upstream seals between said closure member assembly and said body at a closed position of said closure member (b) radial gaps compensating means for reducing and eliminating mechanical and thermal gaps between said bearing bore and said outside diameter of said bearing, between said inside diameter surface of said bearing and said outside diameter of said stem (c) load supporting means for supporting side loads of said stem under fluid pressures and operation forces and for protecting said stem packing from said loads (d) vibration suppressing means for suppressing said stem vibration and reducing fluid leakage by eliminating said gaps.

5. In a fluid related device comprising at least one stem seal assembly, a body assembly having a body, a seat assembly, a closure member assembly having at least one stem movably positioned in said body assembly, said stem seal assembly has at least one pair of laminated packing and at least one pair of compression rings, said body having at least one packing hole, said stem seal assembly positioned between said stem and said packing hole, said pair of laminated packing including an upper packing and a lower packing, said upper packing having a bottom layer with a bottom dynamic seal surface, said lower packing having a top layer with a top dynamic seal surface, said packing is made out of one of materials including metals, metals and graphite, metals and polymers, said stem rotatably positioned in said packing hole of said body having a shoulder (I ring) defined by an upper seal surface and a lower seal surface and constructed with one of structures including said shoulder as an integral part of said stem and said shoulder permanently assembled with said stem, each of said surfaces of said shoulder is defined by one of surface profiles including a conical surface and a spherical surface, said compression rings including an upper compression ring and a lower compression ring, said upper compression ring having a bottom mating surface engaged with said upper seal surface of said shoulder for providing static seals between said stem and said upper compression ring and a top seal surface engaged with said bottom surface of said upper packing for providing dynamic seals, said lower compression ring having a top mating surface engaged with said lower seal surface of said shoulder for providing static seals between said stem and said lower compression ring and a bottom seal surface engaged with said top surface of said lower packing for providing dynamic seals, said pair of compression rings, said shoulder of said stem and said pair of said packing, said packing hole of said body having (a) seal means for providing seals between said stem and said pair of packing, said stem and said pair of compression rings, said pair of packing and said pair of compression rings, and said packing hole and said pair of packing (b) seal converting means for converting radial dynamic seals to two static seals between said shoulder and said pair of compression rings (c) spring means for providing live loads for all static and dynamic seals and compensating any wearing between said compression rings and said packing (d) load balancing means for balancing the weights of said stem and said closure member against a line pressure and reducing wearing of said seat assembly during opening and closing of said closure member (e) blowout preventing means for preventing said stem from blowout in case of said stem broken down under said shoulder due to a line pressure.

6. The device of claim 5, wherein said closure member assembly rotatably positioned in said body between open and closed positions including (a) said at least one stem (b) said closure member (c) at least one key, said closure member has an upper hub, a lower hub and a stem hole through said hubs to receive said stem, said key with a finish surface 63 RMS has one of profiles including a flat stem joint surface, a flat bottom surface, a flat side surface and a flat stem joint surface, a side surface, a bottom surface with a base, an angle between said bottom surface and said stem joint surface is defined by a value between 25 to 65 degrees, said closure member has at least one open keyway at a middle section having mating surfaces engaged with said surfaces of said key, said stem having at least one radial open slot defined by a flat key joint surface with a finish surface 63 RMS, said stem has an upper hub mating section and a lower hub mating section respectively engaged with said upper hub and said lower hub of said closure member with clearance fits, said stem having said key joint slot engaged with said mating stem joint surface of said key with non-clearance fits for securing joints between said closure member and said stem under one of directions including clockwise and anti-clockwise rotation directions, said body and said closure member assembly including said closure member with two of said keyways and said stem with two of said slots, two said keys having (a) torsion converting means at a moment of opening of said closure member under one of directions including clockwise and anti-clockwise rotation directions for applying operation torques against fluids with full static fluid pressure through two compression forces through two of said slots respectively engaged with said stem joint surface of each of said keys between said stem and said keyways, two reaction forces through said upper hub section and said lower hub section respectively engaged with said upper hub and said lower hub of said closure member and generating tensions between said hubs and said keyways of said closure member against said fluid pressure and reducing a peak of combination said operation torques and said fluid pressure (b) torsion converting means at a moment of closing of said closure member under one of directions including clockwise and anti-clockwise rotation directions for applying operation torques against flow fluids with an increasing pressure through two compression forces to two of said slots respectively engaged with said stem joint surface of each of said keys between said stem and said keyways, two reaction forces through said upper hub section and said lower hub section respectively engaged with said upper hub and said lower hub of said closure member and generating tensions between said hubs and said keyways of said closure member against water hampers and stopping torsion before fluid pressure reaches a peak and reducing loads on said stem (c) fluid pressure loading transfer means at a closed position of said closure member for transferring pressure loads on said closure member to said stem through said upper and lower hubs respectively engaged with said upper hub section and said lower hub section of said stem and through said keyways and said keys and said slots for eliminating stress concentration on both said up and down hub sections of said stem and said hubs of said closure member, for reducing said gaps between said stem and said hubs, for reducing stem vibrations and reducing thermal deformation and stress corrosion cracking (d) gap suppression means for eliminating said gaps between said stem and said stem hole, between said keys and said keyways, between said keys and said slots of said stem, for eliminating vibrations and lost motions between said stem and said closure member (e) stress concentration suppression means for eliminating stress concentration on said stem and said hubs of said closure member, stress corrosion cracking on said stem and said hubs.

7. In a fluid related device comprising a body assembly and a pair of trim assemblies, said body assembly has a flow port defined by a front of said flow port and a back of said flow port, said trim assemblies respectively positioned in said front and said back of said flow port of said body assembly, said trim assemblies having a front trim and a back trim, said trims made out of a metal material with a hardness at least Rockwell C 22, said front trim has a mating surface engaged with said flow port, said back trim has a mating surface engaged with said flow port, said trim assemblies have one of two trim lock assemblies including (a) a trim lock assembly A having two pairs of pins and a first step bore in said front of said flow port and one of said pair of pins and a second step bore in said back of said flow port and one of said pair of pins, said first step bore having two pin holes in an opposite direction, said front trim also including a mating segment step positioned in a side of said first bore having two cylindrical mating slots aligned up with said two pin holes respectively to receive one of said pins for securing said front trim position, said second step bore having two pin holes in an opposite direction, said back trim also including a mating segment step positioned in a side of said second bore having two cylindrical mating slots respectively aligned up with said two pin holes and respectively to receive one of said pins for securing said back trim position (b) a trim lock assembly B having two pairs of lock rings, each of said lock rings is defined by one of profiles including an eccentric outside diameter surface, a centric inside diameter surface with a slot and a centric outside diameter surface, an eccentric inside diameter surface with a slot, said front trim having a mating groove on said external mating surface, said flow port having a mating groove in said front of said port, one of said pair of said lock rings positioned between said mating grooves for securing said front trim position by rotating said eccentric lock rings, said back trim having a mating groove on said back external mating surface, said flow port having a mating groove on said back of said fluid port, one of said pairs of said lock rings positioned between said mating grooves for securing said back trim position by rotating said eccentric lock rings.

8. The device of claim 7, wherein said body is constructed with structures including an one-piece body, a two-piece body and a three-piece body, said two-piece body has a front part and back part, said trim assemblies having arrangements including (1) said trim assemblies respectively positioned in said front part and said back part (2) said trim assemblies respectively positioned in said front part and between said front part and said back part, said three-piece body has a front section, a middle section and back section, said trim assemblies having arrangements including (a) said trim assemblies respectively positioned in said front section and in said back section (b) said trim assemblies respectively positioned between said front section and said middle section and between said back section and said middle section.

9. The device of claim 8, further including a closure member assembly, said closures member assembly rotatably positioned between said trim assemblies in said flow port of said body assembly, said trim assemblies are arranged in a parallel manner, said back trim has a back surface, a right side surface and a front surface defined by a rotary profile of said closure member and multiple non-blind holes with 0 degree from a center line of said flow port between said front surface and said back surface, said holes defined by sizes ranging from small diameters near walls of said flow port to large diameters near said center line of said flow port, said front trim has a left side surface to be complementary with said right side of said back trim, a front surface and a back surface defined by said rotary profile of said closure member and multiple non-blind holes with 0 degree from said center line of said flow port between said front and said back surfaces, said holes defined by sizes ranging from small diameters near walls of said flow port to large diameters near said center line of said flow port, said front trim is positioned at a left side of said flow port, said back trim is positioned at a right side of said flow port, a ratio of total areas of said holes over an area of said flow port is a value between 0.30 to 0.85, said closure member movably positioned between said trim assemblies in said fluid port of said body having (1) flow control means for throttling flow fluid with minimizing flow capacity loss (2) cavitation suppressing means for suppressing cavitations with minimizing flow capacity loss (3) vibration suppressing means for suppressing vibrations with minimizing flow capacity loss.

10. The device of claim 8, wherein said back trim has a back surface defined by one of profiles including a flat surface, a conical surface and a spherical surface, a right side surface and a front surface defined by one of profiles including a flat surface, a conical surface and a spherical surface and multiple non-blind holes with 0 degree from a center line of said flow port between said front surface and said back surface, said holes defined by sizes ranging from small diameters near walls of said flow port to large diameters near said center line of said flow port, said front trim has a left side surface, a front surface defined by one of profiles including a flat surface, a conical surface and a spherical surface and a back surface defined by one of profiles including a flat surface, a conical surface and a spherical surface and multiple non-blind holes with 0 degree from said center line of said flow port between said front surface and said back surface, said holes defined by sizes ranging from small diameters near walls of said flow port to large diameters near said center line of said flow port, said front trim is positioned at a la side of said flow port, said back trim is positioned at a side of said flow port, a ratio of total areas of said holes over an area of said flow port is a value between 0.30 to 0.85, said trim assemblies having (1) cavitation suppressing means for suppressing cavitations with minimizing flow capacity loss (2) vibration suppressing means for suppressing vibrations with minimizing flow capacity loss.

* * * * *